US006605232B1

(12) United States Patent
Montgomery et al.

(10) Patent No.: US 6,605,232 B1
(45) Date of Patent: Aug. 12, 2003

(54) BIODEGRADEABLE DEICING COMPOSITION

(75) Inventors: Rex Montgomery, Iowa City, IA (US); Byung Yun Yang, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/262,266

(22) Filed: Oct. 1, 2002

(51) Int. Cl.[7] .................................................. C09K 3/18
(52) U.S. Cl. ........................................... 252/70; 106/13
(58) Field of Search ............................... 252/70; 106/13

(56) References Cited

U.S. PATENT DOCUMENTS

| | | | |
|---|---|---|---|
| 4,824,588 A | * 4/1989 | Lin ............................. | 252/70 |
| 5,635,101 A | 6/1997 | Janke et al. ................. | 252/70 |
| 5,709,812 A | 1/1998 | Janke et al. ................. | 252/70 |
| 5,709,813 A | 1/1998 | Janke et al. ................. | 252/70 |
| 5,817,780 A | * 10/1998 | Fleche et al. ............... | 536/18.6 |
| 5,876,621 A | * 3/1999 | Sapienza ..................... | 252/70 |
| 5,980,774 A | * 11/1999 | Sapienza ..................... | 252/70 |
| 6,129,857 A | * 10/2000 | Sapienza ..................... | 252/70 |
| 6,156,226 A | 12/2000 | Klyosov et al. ............. | 252/70 |
| 6,287,480 B1 | 9/2001 | Berglund et al. ............ | 252/70 |
| 6,315,919 B1 | * 11/2001 | Sapienza ..................... | 252/70 |

* cited by examiner

*Primary Examiner*—Anthony J. Green
(74) *Attorney, Agent, or Firm*—McKee, Voorhees & Sease, P.L.C.

(57) ABSTRACT

The present invention relates to a novel deicing/anti-icing composition. The composition is formed by alkalinically degrading reducing sugars. The reducing sugars are preferably found in an industrial waste stream, such as corn steep water. The composition is inexpensive, biodegradeable, and nontoxic to the environment.

38 Claims, 3 Drawing Sheets

BIODEGRADEABLE DEICING COMPOSITION

FIELD OF THE INVENTION

This invention relates to deicing and anti-icing compositions for use in preventing or reducing ice and snow accumulation on surfaces, such as roads, driveways, walks, airport runways, and vegetation using biodegradable materials.

BACKGROUND OF THE INVENTION

Deicing compositions are widely used during inclement weather for deicing and preventing snow and ice formation on roads, sidewalks, airport runways, and many other surfaces. Desired properties and effects of deicing preparations include cost-effectiveness, ease of application to roads or other surfaces, prevention of ice formation, reduction of the bonding of snow to the surface of the road, non-corrosive, biodegradeable, safe for the environment, ability to penetrate ice and snow on roads, rapid dissolution after application of the solid mixture, and low or no conductivity on surfaces.

Chlorides, such as sodium, calcium, and magnesium chloride, are effective and inexpensive deicing compounds. Calcium and magnesium chlorides offer the additional benefit of being exothermic upon dissolution, and therefore effective in melting ice even at low temperatures. The use of chlorides as deicers has several drawbacks, however. For instance, the massive use of chloride salts for roadway deicing has been questioned because of residual effects on the environment, such as the pollution of aquatic habitats, ground water, and roadside vegetation. Chloride salt use has also been associated with corrosion and/or deterioration of concrete and metals used in infrastructures. In addition, calcium and magnesium chlorides can be hazardous to human health if inhaled or digested, and leave a slippery residue that is difficult to clean. Both calcium and magnesium chloride salts are also hygroscopic, which can cause them to clump and liquefy during storage.

Alternative anti-icing and deicing materials have been the continuing subjects of scientific and industrial interest. Calcium magnesium acetate (CMA) and methanol are effective and non-corrosive deicing chemicals. CMA competes well with sodium chloride for this purpose, particularly with respect to biodegradability and environmental safety. The use of CMA as a deicer is limited, however, due to its relatively high cost of production. Similarly, potassium acetate has proven especially effective in deicing applications in airports, but too expensive for conventional applications.

Some amelioration of the adverse effects of chlorides has been achieved through the addition of carbohydrates to deicing compositions. Native or modified polysaccharides derived from either starch or cellulose have proven useful in deicing highways when mixed with chloride salts. Low molecular weight (i.e. <1000) sugars applied in concentrated solutions have proven useful in freezing point depression. The presence of glucose or fructose in deicing and/or anti-icing solutions synergistically inhibits or reduces the corrosive effects of chloride salts. Methyl glucoside and other methyl oligo-glycosides combined with chloride salts are also effective in increasing the rate of ice melting and helping other deicing chemicals work at lower temperatures.

The present inventors have now surprisingly found that chloride salts that are conventionally used in deicing compositions may be replaced with the unfractionated product from the alkaline degradation of reducing sugars. These novel deicing compositions eliminate the deleterious effects associated with conventional chloride-containing deicing compositions.

It is therefore a primary objective of the present invention to provide a novel composition for deicing and preventing the formation of ice and snow on surfaces.

It is a further objective of the present invention to provide a composition for deicing and preventing formation of ice and snow on surfaces that does not contain chlorides.

It is still a further objective of the present invention to provide a composition for deicing and preventing formation of ice and snow on surfaces that may be isolated from agribusiness waste streams.

It is yet a further objective of the present invention to provide a composition for deicing and preventing formation of ice and snow on surfaces that is biodegradeable.

It is still a further objective of the present invention to provide a composition for deicing and preventing formation of ice and snow on surfaces that is environmentally safe.

It is another objective of the present invention to provide a composition for deicing and preventing formation of ice and snow on surfaces that is effective in depressing the freezing point of water.

It is a further objective of the present invention to provide a composition for deicing and preventing formation of ice and snow on surfaces that is economical to manufacture and easy to store.

These and other objectives will become clear from the foregoing detailed description.

SUMMARY OF THE INVENTION

The present invention is directed to a composition for deicing and preventing the formation of ice and snow on surfaces, such as roadways, walks, driveways, and airport runways. The deicing composition consists of the unfractionated product from alkaline degradation of reducing sugars. The preferred source of reducing sugars for this purpose is waste streams from agribusinesses and, most preferably, corn steep water.

Reducing sugars degraded in accordance with this invention are effective in increasing the ionic strength and the depression of the freezing point of water without the inclusion of corrosive chloride salts. The resulting compositions are environmentally safe and biodegradeable, and further make use of readily available, inexpensive starting materials.

DETAILED DESCRIPTION OF THE INVENTION

Figure 1:
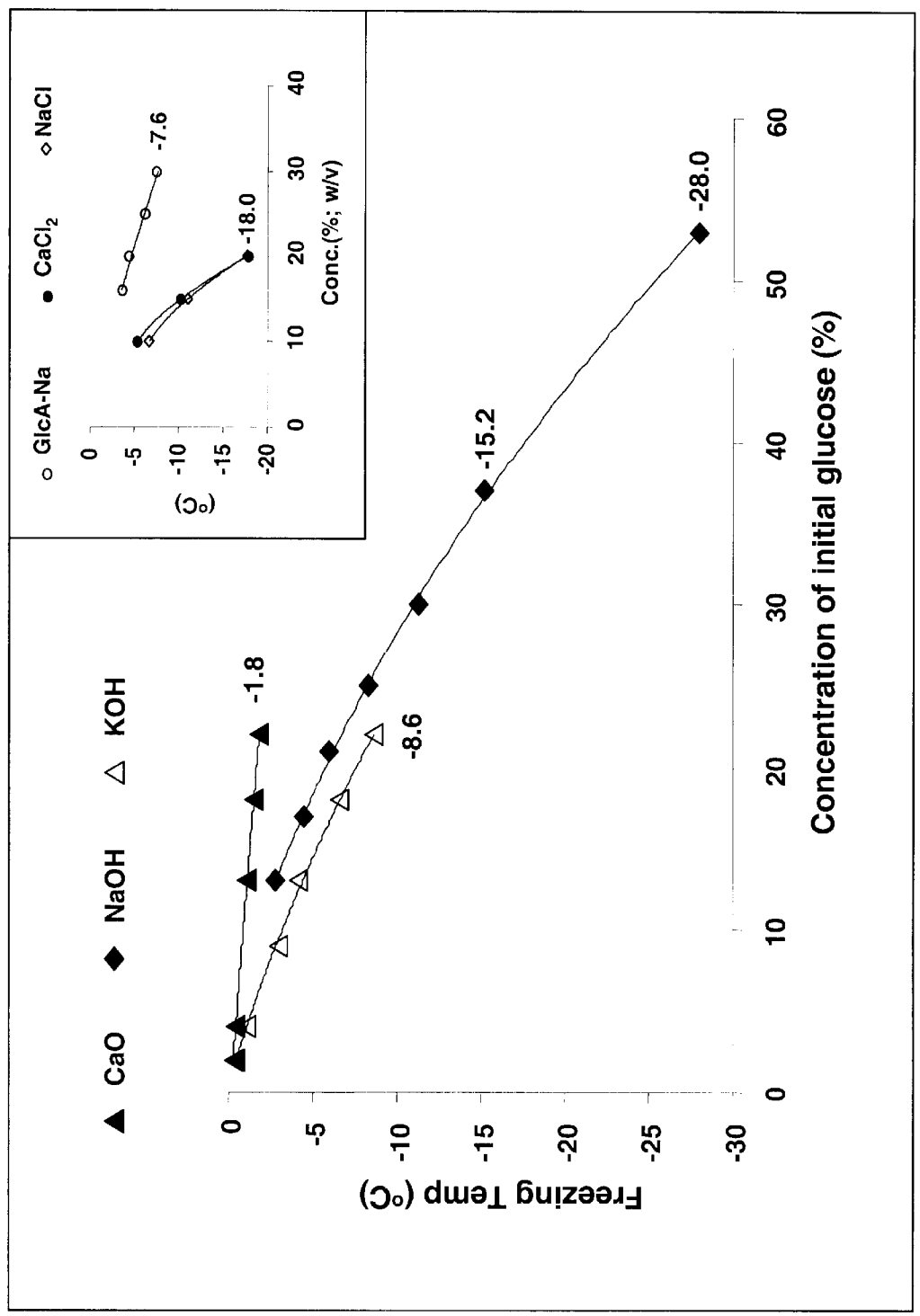
FIG. 1 is a graph illustrating freezing temperature of alkaline degradation products of glucose in water and the effect of their concentration. Degradation products of 22% initial glucose concentration were prepared as described in Table 1 and diluted or concentrated before determination (Inset). Sodium gluconate (GlcA-Na), NaCl and $CaCl_2$ are included for comparison.

By-products of agricultural businesses usually contain carbohydrate and protein. Fibers are principally carbohydrate in some complex form, such as cellulose, lignin, or hemicellulose. Fermentation liquors contain a complex of microbial nutrient salts and residuals, such as corn protein from alcohol fermentation of dry-milled corn. They are available in large quantities and as low-valued byproducts provide an inexpensive source of materials for deicer/anti-icer preparations.

While agribusiness waste streams have been proposed and commercialized as de-icers, their effectiveness has been limited without the inclusion of some low molecular weight compounds, notably chloride salts, to increase the ionic strength and the depression of the freezing point of water. The present inventors have now surprisingly discovered that the same de-icing results may be achieved without the addition of low molecular weight compounds through alkaline degradation of the reducing sugars dissolved in these byproduct streams. This unique degradation process increases the concentration of low molecular weight molecules in the solution, which in turn may be used to produce a composition that depresses the freezing point of water.

Corn steep water (CSW), either in concentrated form or mixed with chloride salts, is available as a commercial deicer product (Ice Ban™). While the deicing properties of CSW have been previously recognized, CSW has primarily been used only to reduce the corrosive properties of added chloride salts. Being a colligative property, freezing points of solutions are decreased proportionately to the ionic strength derived frequently from Na, K, or Ca salts in deicers. The present invention provides the advantage of generating anions in situ to neutralize the alkali added for desirable freezing point depression, while still maintaining the advantageous properties of the CSW components.

Appropriate starting materials for use in the invention may include solutions of reducing sugars, which include monosaccharides, and all oligosaccharides except sucrose. Examples of appropriate reducing sugars include glucose, fructose, galactose, ribose, and/or deoxyribose, xylose, arabinose, lactose, and maltose. Glucose and fructose are the preferred reducing sugars for this purpose. In the alternative, the starting material may include non-reducing sugars, such as sucrose, starch, glycogen, amylase, amylopectin, cellulose, dextrin, etc. If the starting material includes non-reducing sugars, it is preferably treated with a glycohydrolase to break down the complex sugars into reducing sugars. While it is not critical to break down all of the complex sugars, a high concentration of complex sugars in the final de-icing product may have a negative impact on the extent of freezing point depression.

The preferred sources of reducing sugars are waste streams from agribusinesses, such as sugar by-products. Agribusiness waste streams provide an additional non-corrosive benefit to the final de-icing compositions of this invention. However, it is to be understood that sources of reducing sugars other than agribusiness waste streams are also appropriate for use in this invention.

Agribusiness waste streams contain varying amounts of reducing sugars, and it may therefore be desirable, but not necessary, to supplement the waste streams with reducing sugars to achieve a particular concentration of reducing sugars in the final de-icing product. As a general guideline, the glucose or other reducing sugar may be added in an amount so that the resulting concentration of reducing sugar in the CSW or other solution is up to about 200 parts by weight in grams of reducing sugar to 100 parts of liquid by volume in milliliters, with about 10–100 parts by weight in grams of reducing sugar being preferred, and about 10–70 parts by weight in grams of reducing sugar being most preferred. It is also possible to mix the dry reducing sugar with the alkaline reagent without adding any solvent. For the sake of convenience, "CSW" will be understood to refer not only to corn steep water, but other types of waste streams from agricultural businesses as described above.

In accordance with this invention, the CSW or other reducing sugar source is first treated with an alkali to degrade the reducing sugars into a complex mixture of hydroxy organic acids that consist primarily of lactic acid. Appropriate alkalis for this purpose include divalent and monovalent alkalis, such as $Ca(OH)_2$, $Mg(OH)_2$, NaOH, KOH, or mixtures thereof. Monovalent alkalis such as NaOH and KOH are most preferred. In this respect, it is preferred to treat a reducing sugar solution with an alkali solution. However, it is also possible to treat a solid reducing sugar source with an alkali solution, and vice versa, as well as reacting a solid reducing sugar source with solid alkali.

Sufficient alkali should be added to substantially degrade the reducing sugars. As used herein, the term "substantially degrade the reducing sugars" refers to the fact that the reducing sugars are degraded to the extent that the resulting composition lowers the freezing point of water more than the original CSW that has not been alkalinically degraded.

As a general guideline, sufficient alkali should be added to give a final pH of 7–9 after the alkaline degradation reaction of the reducing sugars and so as to neutralize the pH of the CSW (pH≈4.0) to a range of between about 6.0–9.0, with a pH of about 7.0–7.5 being preferred. As another guideline, the reducing sugars should be prepared with approximately an equimolar amount of divalent alkali, or with approximately twice the molar equivalent of monovalent alkali, preferably with stirring. In this step, the CSW/reducing sugar is preferably treated at a temperature ranging from about 60–220° C., with about 60–125° C. being preferred. The reaction should be allowed to continue for about 20 minutes to 16 hours depending upon the temperature of the reaction, with about 30 minutes at 100° C. or 16 hours at 60° C. being preferred. The reducing sugars will also react with the alkali without the addition of heat. This method is not preferred, however, since the reaction may take several days to weeks to complete.

Alkalinic treatment of CSW in accordance with this invention results in the precipitation of proteins. These proteins may be isolated for other uses, such as high-protein animal feed, by conventional means. If recovery of the proteins is not desired or convenient, the proteins may be degraded or partially digested through the addition of proteases to the CSW prior to alkalinic degradation. Appropriate enzymes for this purpose include water-soluble proteases of *Aspergillus oryzae* or *Aspergillus niger*. As already noted above, any complex carbohydrates present in the waste water may be hydrolyzed to their reducing sugar components by appropriate glycohydrolases, such as starch by amylases and amyloglucosidase, or sucrose by invertase. If included, the enzymes should be added in a concentration of from about 0.5 to 2% by weight. Persons skilled in the art can readily determine other appropriate proteases and glucohydrolases and their concentrations that may be used for this purpose.

The products resulting from alkalinic degradation of reducing sugars comprise a mixture of Ca, Na, and/or K salts of hydroxy acids that act as de-icing materials by reducing the freezing point of water. Some of these hydroxy acids include glycolic, lactic, glyceric acids, 2-C-methylglyceric, 2- and 3-deoxytetronic, tetronic, pentonic and hexonic acids. The distribution of the acids in the degradation product varies according to the starting concentration of sugar.

The de-icing product is effective in lowering the freezing point of water to between about −5 and −30° C. Studies indicate that the de-icing product shows greater freezing point depression when the CSW is treated with protease prior to the alkalinic treatment step. Further, better results are obtained when a monovalent alkali, such as KOH or NaOH is used, rather than a divalent alkali, such as CaO. A significant decrease in freezing point is also seen when from about 20–150 parts by weight in grams of glucose or other other reducing sugars are added to 100 parts by volume in milliliters of CSW prior to alkalinic degradation.

The resulting de-icing/anti-icing solution may be used as-is (in liquid form), dried by conventional methods, or freeze-dried and pulverized to a fine powder for more convenient application.

The de-icing composition of the present invention may contain other de-icing additives, such as sand, river gravel, cinders, sawdust, other skid-reducing materials, as well as other chemical deicing agents, including chloride salts, although the addition of chloride salts negates the biodegradeable/non-toxic properties of the composition. The composition is preferably applied to roads, walkways, sidewalks, airport runways, or other surfaces prior to the accumulation of snow and ice in order to prevent the snow and ice from adhering to the surface. The composition may also be applied to melt existing snow and ice, to prevent further accumulation, and/or facilitate removal. The composition may generally be applied in an amount of 20 to 60 gallons per lane mile, or 0.5 to 1.5 ounces per square yard. However, there is no set upper or lower limit regarding the amount of composition that must be applied to a particular surface. The optimum amount of deicing/anti-icing composition will depend on a wide variety of factors, including degree of snow and/or ice accumulation, safety considerations, cost, convenience, presence of other de-icing components, etc. Persons skilled in the art can readily ascertain appropriate amounts/concentrations of deicing/anti-icing composition to be applied to a particular surface in particular circumstances.

In addition to all of the above, as is well understood by those skilled in the art, other minors can be added to the basic de-icing composition to enhance its performance, aid in packaging, etc. For example, dyes can be added at very minor levels as can diluents such as alcohol, buffers, stabilizers, wetting agents, dissolving agents, defoaming agents, etc. With the exception of diluents such as alcohols which are used at higher levels, the levels of these minors are generally not more than 0.001% to 1.0% by weight.

The deicing composition of this invention offers several advantages over conventional chloride salt-containing de-icers. First, the compositions are biodegradeable, non-corrosive, and safe for the environment. Further, the compositions may be manufactured from an inexpensive, readily available source, namely industrial waste from agribusinesses.

The following examples are offered to illustrate but not limit the invention. Thus, they are presented with the understanding that various formulation, manufacturing, and other modifications may be made and still are within the spirit of the invention.

EXAMPLE 1

44 g of glucose and 19.55 g of NaOH were dissolved in 200 mL of water and heated with stirring at 100° C. for 2 hours. The resulting degradation products were diluted or concentrated in a rotary evaporator and analyzed for the respective freezing temperatures. Degradation products of glucose by different alkali were also prepared using KOH (27.4 g) or CaO (12.4 g). These results are summarized in FIG. 1. Aqueous solutions of NaCl, $CaCl_2$ and sodium gluconate (GlcA-Na) were included for comparison (inset).

EXAMPLE 2

Figure 2:
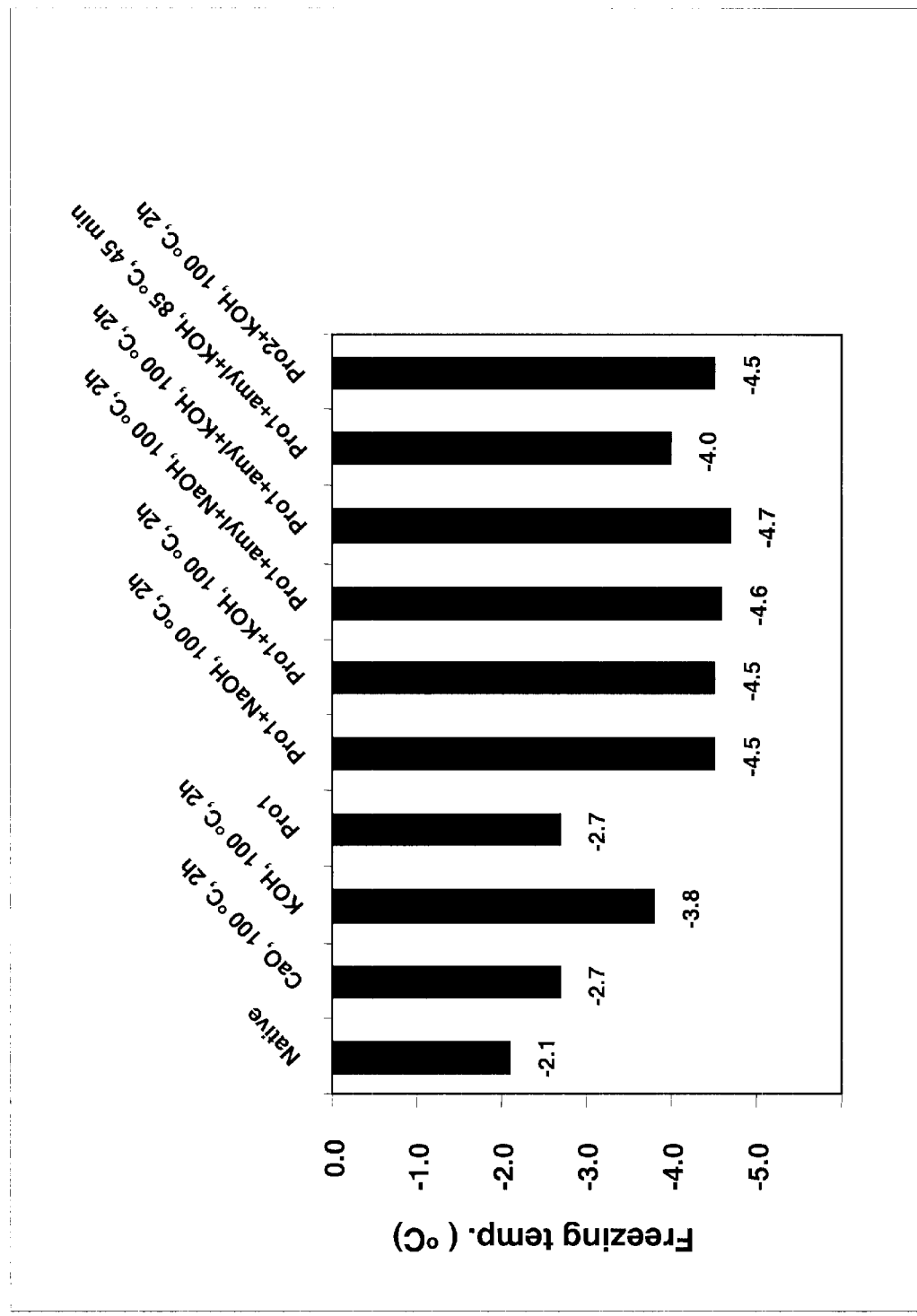
FIG. 2 is a graph illustrating the freezing temperatures of various CSWs treated with enzyme and alkali (100° C. and 80° C.). Pro1 and Pro2: proteases from *A. oryzae var.* and *A. niger*; amyl: bacterial amylase from *B. subtilis*.

Corn steep water (100 mL) was mixed with water-soluble proteases (1.0 g) of *Aspergillus oryzae* (Pro1) or *Aspergillus niger* (Pro2) and incubated at 50° C. for 24 h. The resulting solution was adjusted to pH 6 with 2.5 mL of 10 M KOH (or equimolar amounts of NaOH) and incubated further at 50° C. for 24 h with or without bacterial amylase (amyl) from *B. subtilis* (0.2 mg). The resulting solution was adjusted to pH 12.5 with 9.2 mL of 10 M KOH (or equimolar amounts of NaOH) and heated at 100° C. for 2 h, or 85° C. for 45 minutes, with n-octanol (100 µL) as a de-foaming agent. The freezing point of the resulting solution was determined directly and summarized in FIG. 2. The effect of various treatments to the corn steep water was also included for comparison.

Waste water from other industries that contain different sugars, such as sucrose or lactose, would use an appropriate glycohydrolase, such as invertase for sucrose, to hydrolyze the sugars to their component simple sugars, glucose and fructose in the case of sucrose. In this example, the starch content of the CSW was relatively small so that the hydrolysis by the amylase added little to the freezing point depression of the products of alkaline degradation.

EXAMPLE 3

Figure 3:
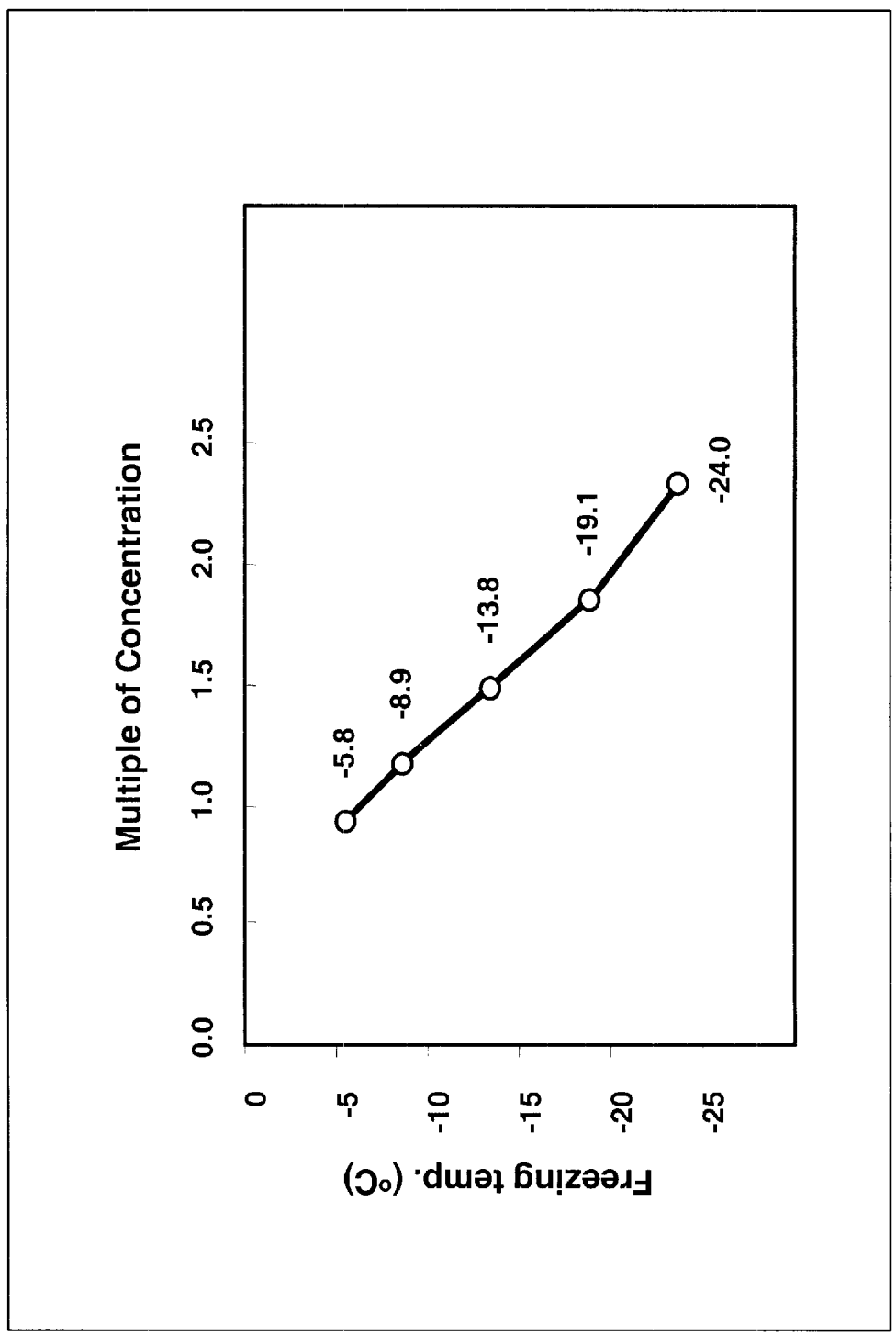
FIG. 3 is a graph illustrating the effect of concentration on the freezing temperatures depression of alkali degradation solution (KOH, 100° C., 2 h) or protease-digested (*A. oryzae var.*) CSW. The reacted solution was appropriately concentrated in vacuo at 45° C.

Corn steep water (200 mL) was mixed with water-soluble proteases (2.0 g) of *Aspergillus oryzae* and incubated at 50° C. for 16 h. The resulting solution was adjusted to pH 12.5 with 10 M KOH (18.4 mL) and heated at 100° C. for 2 h with n-octanol (200 µL) as a de-foaming agent. These insoluble materials (small amount) was removed by centrifugation and the resulting supernatant was appropriately reduced in rotary evaporate (45° C.) and analyzed for the freezing point. The results against the extent of concentration from the initial volume are summarized in FIG. 3.

EXAMPLE 4

The protein from corn steep water (100 mL) was precipitated by adjusting pH to 7.0 with NaOH of 1.44 g. The supernatant was recovered by centrifugation (9800 g, 30 min) and mixed with glucose of 20 g and NaOH of 7.4 g and then heated at 81° C. for 1–2 hours. The resulting solution showed a freezing temperature of −10 to −11° C.

EXAMPLE 5

44 g of glucose and 19.55 g of NaOH were dissolved in water of 200 mL and heated with stirring to 100° C. for 2 hours. The resulting reaction solution was freeze-dried and further dried in a high vacuum desiccator (60° C., 24 h) before pulverization. The resulting solid materials were dissolved in the supernatant of corn steep water at pH 7, as described in Example 4, or the protease-digested corn steep water, as described in Example 3. The freezing temperatures of the resulting solutions are summarized in Table 1, together with NaCl for comparison.

TABLE 1

| Conc. % | Freezing temperature (° C.) | | | |
|---|---|---|---|---|
| | CSW 2 | | CSW 1 | |
| (w/v)[1] | Glc-NaOH | NaCl | Glc-NaOH | NaCl |
| 10 | −5.6 ± 0.4 | −10.3 ± 0.1 | −5.6 ± 0.2 | −11.3 ± 1.4 |
| 15 | Nd | −13.3 ± 1.1 | −7.4 ± 0.1 | −15.5 ± 1.0 |
| 20 | −8.8 ± 0.6 | −18.1 ± 0.5 | −9.8 ± 0.3 | −19.6 ± 1.0 |
| 23 | Nd | −21.0 ± 0.1 | Nd | −21.5 ± 1.5 |
| 25 | −12.1 ± 1.2 | Nd | −11.4 ± 0.0 | Nd |
| 30 | −12.9 ± 0.9 | Nd | −13.4 ± 1.0 | Nd |

[1]Concentration of reaction solids or NaCl in parts by weight in grams and CSW in parts by volume in milliliters
Nd: not determined

EXAMPLE 6

Glucose (100 g) was dissolved in corn steep water (50 mL) at 60° C. n-octanol 500 μl) was added to reduce any foaming, followed by KOH (34.36 g) in three portions and with stirring. The resulting solution was maintained at 60° C. for 16 h. The resulting product was appropriately diluted with water and analyzed for freezing temperature, viscosity and specific gravity (Table 2). These results are summarized together with the soluble solid content (dried in vacuo, 60° C., 24 h) in the resulting solution. Data for ethylene glycol was included for comparison.

TABLE 2

| Dry weight[1] | Freezing | Viscosity[2] (cp) | | | Specific gravity (g/mL) |
|---|---|---|---|---|---|
| % (w/w) | Temp (° C.) | 20° C. | 5° C. | −8° C. | 25° C. |
| 52.8 | −26.6 | 13.4 | 18.2 | 54.2 | 1.273 |
| 56.2 | −29.3 | 20.4 | 43.1 | 90.8 | 1.298 |
| 59.3 | −29.3 | 31.5 | 72.5 | 91.7 | 1.315 |
| 65.7 | nc | 62.8 | 237.7 | 615.5[3] | 1.360 |
| Ethylene glycol | | 18.9 | 40.9 | 76.1 | 1.112 |
| | | (19.9)[4] | | | (1.113)[5] |

Nc: no crystallization observed.
[1]sample dried in high vacuum desiccator (60' C., 24 h)
[2]viscosities in the range of sheer rate 100–400 (s$^{-1}$)
[3]viscosities in the range of sheer rate 100–200 (s$^{-1}$)
[4]CRC Handbook of Chemistry and Physics, 60th Ed.
[5]nominal value of ethylene glycol.

Having described the invention with reference to particular compositions and methods, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims.

What is claimed is:

1. A deicing composition comprising: alkaline degradation products of reducing sugars; said deicing composition not including a chloride salt.

2. The deicing composition of claim 1 wherein the reducing sugars are one or more monosaccharides or reducing oligosaccharides.

3. The deicing composition of claim 2 wherein the reducing sugars are one or more selected from the group consisting of glucose, fructose, sucrose, galactose, xylose, arabinose, maltose, lactose, ribose, and deoxyribose.

4. The deicing composition of claim 1 wherein the reducing sugars are present in the composition in a concentration ranging from about 10–70 parts by weight in grams of reducing sugar dissolved in 100 parts by volume in milliliters of solvent.

5. The deicing composition of claim 1 wherein the reducing sugars are from an agribusiness waste stream.

6. The deicing composition of claim 5 wherein the waste stream is steep water from an agribusiness selected from the group consisting of corn wet milling, milk whey, wine, beer, and sugar.

7. The deicing composition of claim 6 wherein the waste stream is corn steep water.

8. The deicing composition of claim 1 wherein the reducing sugars are alkalinically degraded with one or more alkalis selected from the group consisting of divalent alkalis, monovalent alkalis, and combinations thereof.

9. The deicing composition of claim 8 wherein the divalent alkalis are selected from the group consisting of calcium hydroxide, calcium oxide, and magnesium hydroxide.

10. The deicing composition of claim 8 wherein the monovalent alkalis are selected from the group consisting of sodium hydroxide and potassium hydroxide.

11. The deicing composition of claim 1 further containing one or more other deicing components.

12. The deicing composition of claim 11 wherein the other deicing components are selected from the group consisting of sand, river gravel, cinders, sawdust, and skid-reducing materials.

13. A method of making a deicing composition comprising: alkalinically degrading reducing sugars to form a deicing composition that does not include a chloride salt.

14. The method of claim 13 whereby the reducing sugars are alkalinically degraded by combining them with an alkali.

15. The method of claim 14 whereby the composition contains from about 10–200 parts by weight in grams of reducing sugar dissolved in 100 parts by volume in milliliters of solvent.

16. The method of claim 14 wherein the alkali is selected from the group consisting of a monovalent alkali, a divalent alkali, and combinations thereof.

17. The method of claim 14 wherein the alkali is added to the reducing sugars in an amount sufficient to substantially degrade the reducing sugars.

18. The method of claim 14 wherein the alkali is added to the reducing sugars in an amount sufficient to degrade the reducing sugars to give a final pH range of between about 6.0–9.0.

19. The method of claim 13 wherein the reducing sugars are alkalinically degraded at a temperature ranging between about 60–220° C.

20. The method of claim 19 wherein the reducing sugars are alkalinically degraded at a temperature ranging between about 60–125° C.

21. The method of claim 13 wherein the reducing sugars are from an agribusiness waste stream.

22. The method of claim 21 wherein the waste stream is corn steep water.

23. The method of claim 21 further including the step of adding reducing sugars to the waste stream prior to alkalinic degradation.

24. The method of claim 23 wherein the reducing sugars added to the waste stream are alkalinically degraded prior to adding them to the waste stream.

25. The method of claim 23 further including the step of: separating precipitated proteins from the alkalinically degraded reducing sugars.

26. The method of claim 21 further including the step of: enzymatically digesting proteins in the waste stream prior to alkalinic degradation.

27. The method of claim 26 whereby the proteins are enzymatically degraded with an enzyme selected from the group consisting of *Aspergillus oryzae* and *Aspergillus niger*.

28. The method of claim 13 further including the step of: drying the deicing composition.

29. The method of claim 28 wherein the composition is freeze-dried or spray-dried.

30. A method of using a deicing composition formed by alkalinically degrading reducing sugars that does not include a chloride salt, comprising: applying the composition to a surface prior to accumulation of snow and ice on the surface or upon which snow and ice is already present.

31. The method of claim 30 wherein the surface is selected from the group consisting of roads, walkways, sidewalks, airport runways, and planes.

32. The method of claim 30 whereby the composition is applied to the surface prior to accumulation of snow and/or ice.

33. A method of making a deicing composition comprising: alkalinically degrading reducing sugars to form a deicing composition; and separating precipitated proteins from the alkalinically degraded reducing sugars.

34. A method of making a deicing composition comprising: alkalinically degrading reducing sugars to form a deicing composition, wherein the reducing sugars are from an agribusiness waste stream; and enzymatically digesting proteins in the waste stream prior to alkalinic degradation.

35. The method of claim 34 wherein the proteins are enzymatically degraded with an enzyme selected from the group consisting of *Aspergillus oryzae* and *Aspergillus niger*.

36. A deicing composition comprising: alkaline degradation products of reducing sugars from an agribusiness waste stream.

37. A deicing composition comprising: alkaline degradation products of reducing sugars, said composition including enzymatically degraded proteins.

38. The deicing composition of claim 37 further including water-soluble proteases.

* * * * *

UNITED STATES PATENT AND TRADEMARK OFFICE
CERTIFICATE OF CORRECTION

PATENT NO. : 6,605,232 B1
DATED : August 12, 2003
INVENTOR(S) : Montgomery et al.

It is certified that error appears in the above-identified patent and that said Letters Patent is hereby corrected as shown below:

Column 1,
Line 11, please add as the first paragraph as follows:
-- GRANT REFERENCE
This invention was made with government support under U. S. Department of Agriculture, Grant No. 00-34188-9162. The government may have certain rights in this invention. --

Signed and Sealed this

Twenty-first Day of June, 2005

JON W. DUDAS
*Director of the United States Patent and Trademark Office*